United States Patent

Custer

[15] 3,705,700

[45] Dec. 12, 1972

[54] AIR FLOW CONTROL MEANS FOR CHANNEL WINGED AIRCRAFT

[72] Inventor: Willard R. Custer, 1905 W. Washington Street, Hagerstown, Md. 21740

[22] Filed: Oct. 23, 1970

[21] Appl. No.: 83,326

Related U.S. Application Data

[63] Continuation-in-part of Ser. No. 838,413, July 2, 1969, abandoned.

[52] U.S. Cl. ............ 244/13, 244/12 CW, 244/42 CC
[51] Int. Cl. ................................................ B64c 3/32
[58] Field of Search ........ 244/12 CW, 13, 41, 40, 35, 244/34, 42 C, 42 CC, 42 CF; 415/175, 115, 117, 116, DIG. 1

[56] References Cited

UNITED STATES PATENTS

| 2,937,823 | 5/1960 | Fletcher | 244/12 |
| 3,360,238 | 12/1967 | Koeller et al. | 415/175 |
| 3,398,696 | 8/1968 | Sproule | 415/175 |
| 2,691,494 | 10/1954 | Custer | 244/12 |
| 3,467,043 | 9/1969 | Bowles | 244/42 CC |
| 3,321,157 | 5/1967 | Turner | 244/42 CC |

FOREIGN PATENTS OR APPLICATIONS

| 965,966 | 8/1964 | Great Britain | 415/115 |

*Primary Examiner*—Milton Buchler
*Assistant Examiner*—Stephen G. Kunin
*Attorney*—Raphael Semmes

[57] ABSTRACT

An apparatus for use with channel winged aircraft to seal the airfoil surface of the channel between the trailing edge thereof and the propeller tip, by discharging jets of water rearwardly from the leading edge of the airfoil surface of the channel to form a film of water on said surface. The film of water seals the space between the propeller tip traveling at or near the speed of sound and the channel surface where very low pressure is created just ahead of the propeller tip, so as to prevent spillback of air through this space.

2 Claims, 3 Drawing Figures

PATENTED DEC 12 1972

3,705,700

INVENTOR
WILLARD R. CUSTER

BY Raphael Semmes
ATTORNEY 3,705,700

AIR FLOW CONTROL MEANS FOR CHANNEL WINGED AIRCRAFT

This application is a continuation-in-part of my copending application Ser. No. 838,413, filed July 2, 1969, now abandoned.

BACKGROUND OF THE INVENTION

A number of my prior patents, such as U.S. Pat. Nos. 2,510,959, 2,611,555 and 3,123,321, for example, described varying structures of aircraft having channel wings and the advantages of these channels in providing lifting potential when in flight, combined with high lift at low speeds during take-off and landing. The channels which are disposed in the direction of flight form airfoils, and a blast of fluid flowing through the channels induces a lifting force which is a function of the difference in speeds of the air and gases in the channels and the air beneath the channels. The lifting force is greatest when the aircraft is not moving or moving at low speeds when lift is needed most.

The present invention is designed to take advantage of these characteristics of channel wings in emergency situations, by providing a water storage tank from which the water is discharged by compressed air, which is preferably delivered to the tank by a compressor operated by the aircraft engine. Valve means, actuated either manually or automatically, direct water from the tank to manifolds extending crosswise of the airfoil channels to deliver jets of water from the high point of the airfoil inner surface of the channel, rearwardly through the channel to seal the space between the propeller tip and the trailing edge of the channel.

With the above and other objects in view which will appear as the description proceeds, the invention consists in the novel features herein set forth, illustrated in the accompanying drawings, and more particularly pointed out in the appended claims.

THE DRAWINGS

Referring to the drawings in which numerals of like character designate similar parts throughout the several views.

Figure 1:
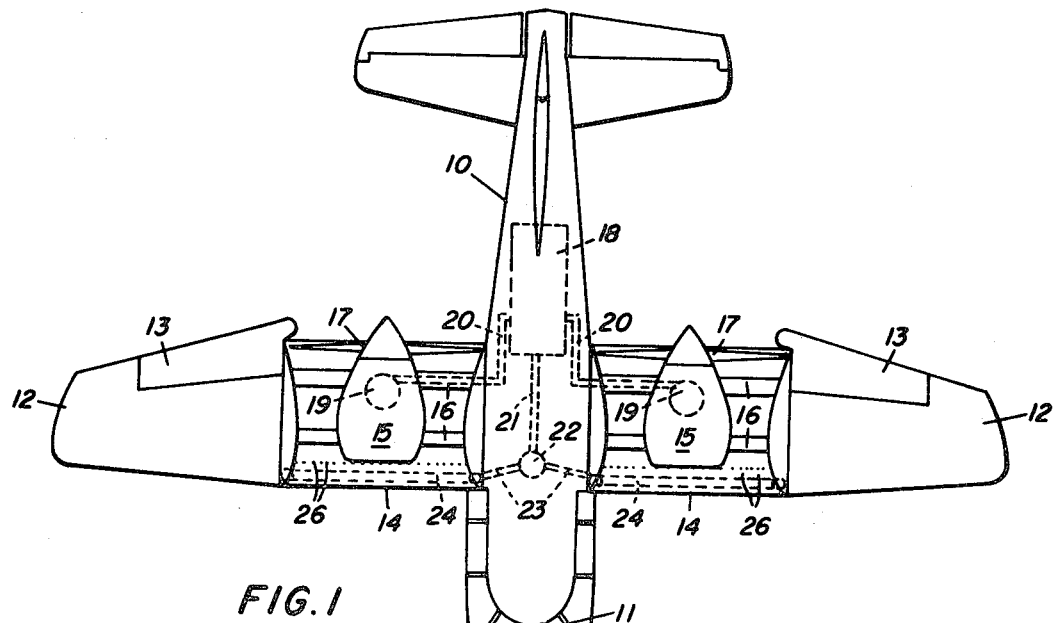
FIG. 1 is a top plan view of an aircraft embodying the present invention.
Figure 2:
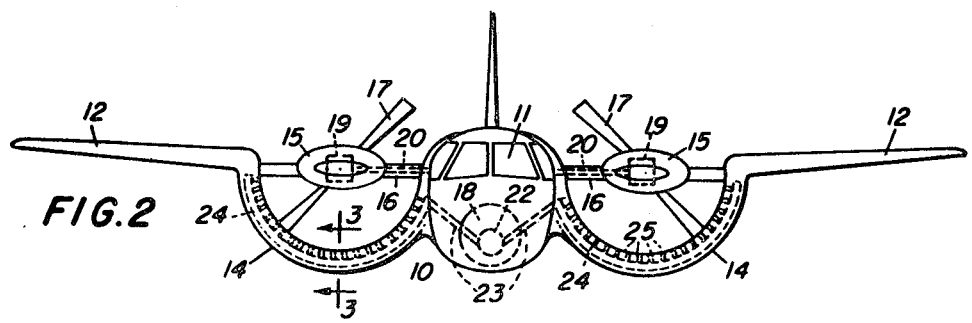
FIG. 2 is a front elevational view of the same.

In FIGS. 1 and 2 of the drawings, which are intended simply for orienting purposes, the numeral 10 designates the fuselage, forward of which is the usual cockpit 11, and extending laterally from the opposite sides of the fuselage are a pair of wings 12 having the usual outboard ailerons 13. The wings 12 are concave at their inboard extremities, and, together with the adjacent surfaces of the fuselage, form channels 14, generally similar to those disclosed in my said prior patents.

Within each channel 14 is a conventional power plant 15, supported by suitable braces 16, and driving propellers 17 at the aft ends of the engines 15 and channels 14 adjacent the trailing edges of the channels.

Figure 3:
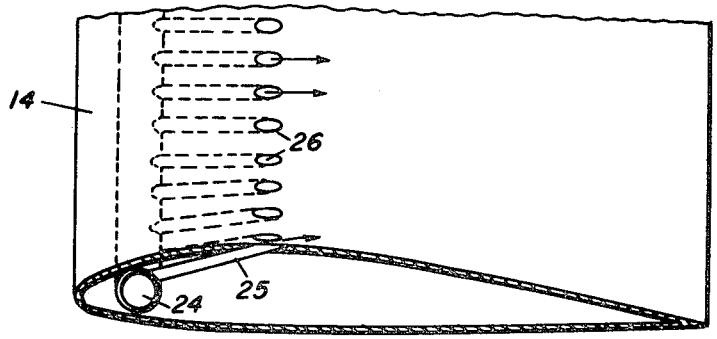
FIG. 3 is an enlarged sectional detail taken on line 3—3 of FIG. 2.

A water storage tank 18 is shown in the present embodiment as being located in the fuselage of the aircraft, but it will be understood that such storage tank or tanks could be located in the wing panels 12. Air compressors 19 are preferably driven by the engines 15 and deliver compressed air to the tank 18 through lines 20 which may extend through the braces 16 supporting the engines. A water discharge line 21, which should be connected in or near the bottom of the tank, leads from the storage tank 18 to a two-way valve 22, which, in turn, communicates through lines 23 with water discharge manifolds 24, best seen in FIG. 3. These manifolds 24 are preferably located within the bottom portions of the channels 14 adjacent their leading edges and extend crosswise of the channels in an arcuate fashion, as shown.

Each of the manifolds 24 is provided with a series of rearwardly directed water jet tubes 25, which discharge as at 26 through jet openings arranged in spaced relation crosswise of the upper surfaces of the channels, substantially at the high points of such surfaces.

The valve 22 may be manually controlled or automatically actuated upon engine failure. For example, it could be actuated electronically by a solenoid which operates to open the valve upon emergency.

In operation, the valve 22 is opened to release water under the influence of compressed air from water supply tank 18 to the manifolds 24. Jets of water flow from each manifold through the respective series of jet tubes 25, which are directed rearwardly through the channels across the upper surfaces thereof, thus forming a rearwardly flowing film which seals the spaces between the tips of propellers 17 and the trailing edges of the airfoil surfaces of channels 14.

As previously pointed out, there is a very low pressure created just ahead of the tip of the propeller in the channel during high speed rotation of the propeller at take-off or landing, and unless some means is provided for sealing the space between the tip of the propeller and the surface of the channel, a considerable spillback of air occurs in this space, which considerably reduces the efficiency of the aircraft. Scientific tests have proven that only water or similar heavy liquid, which will evaporate quickly after introduction to the propeller tip, can seal the channel as required. The introduction of this film of water and placing it where a liquid seal is needed greatly improves the efficiency of the aircraft.

From the foregoing, it is believed that the invention may be readily understood by those skilled in the art without further description, it being borne in mind that numerous changes may be made in details thereof within the spirit of the invention.

I claim:

1. In an aircraft having at least one upwardly opening substantially semi-cylindrical airfoiled channel, and a propeller revolvably mounted adjacent the trailing edge, with the revolving propeller tips defining an orbit closely spaced from the upper channel surface, means for applying a liquid to the upper channel surface in the form of a substantially continuous film and into the space between the channel surface and the propeller tip orbit to seal the area therebetween and prevent spillback leakage of air through the space, said means including liquid storage means in said aircraft, a plurality of rearwardly directed liquid jets having discharge orifices opening for discharge of liquid onto the upper surface of said channel and being operatively interconnected with the liquid storage means, said jets being operable to apply the liquid to the upper channel surface in the form of the substantially continuous film, said jet discharge orifices being transversely spacedly located and positioned across the high point of the airfoiled channel surface and directing liquid flow therefrom toward the trailing edge of the channel as the substantially continuous flowing liquid film, means for maintaining the liquid under pressure, and valve means for selectively controlling liquid flow from said jet discharge orifices.

2. In an aircraft as claimed in claim 1, wherein the liquid consists of water.

* * * * *